United States Patent
Opsenica et al.

(10) Patent No.: US 12,254,357 B2
(45) Date of Patent: Mar. 18, 2025

(54) METHOD, FIRST AGENT AND COMPUTER PROGRAM PRODUCT CONTROLLING COMPUTING RESOURCES IN A CLOUD NETWORK FOR ENABLING A MACHINE LEARNING OPERATION

(71) Applicant: TELEFONAKTIEBOLAGET LM ERICSSON (PUBL), Stockholm (SE)

(72) Inventors: Miljenko Opsenica, Espoo (FI); Joel Patrik Reijonen, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 886 days.

(21) Appl. No.: 17/272,373

(22) PCT Filed: Sep. 26, 2018

(86) PCT No.: PCT/SE2018/050978
§ 371 (c)(1),
(2) Date: Mar. 1, 2021

(87) PCT Pub. No.: WO2020/067938
PCT Pub. Date: Apr. 2, 2020

(65) Prior Publication Data
US 2021/0326185 A1 Oct. 21, 2021

(51) Int. Cl.
*G06F 9/50* (2006.01)
*G06N 20/00* (2019.01)

(52) U.S. Cl.
CPC .......... *G06F 9/5072* (2013.01); *G06F 9/5016* (2013.01); *G06F 9/5027* (2013.01); *G06F 9/5077* (2013.01); *G06N 20/00* (2019.01)

(58) Field of Classification Search
CPC .... G06F 9/5072; G06F 9/5016; G06F 9/5027; G06F 9/502
See application file for complete search history.

(56) References Cited

U.S. PATENT DOCUMENTS 8,868,749 B2 * 10/2014 Bartfai-Walcott ......................... G06F 11/3433 718/105
2010/0050172 A1 2/2010 Ferris
2011/0055377 A1 3/2011 DeHaan
(Continued)

FOREIGN PATENT DOCUMENTS

WO 2011008219 A1 1/2011

OTHER PUBLICATIONS

International Search Report / Written Opinion dated Apr. 16, 2019 in related/corresponding PCT Application No. PCT/SE2018/050978.

*Primary Examiner* — Benjamin C Wu
(74) *Attorney, Agent, or Firm* — Withrow & Terranova, PLLC

(57) ABSTRACT

A method and a first agent controlling computing resources in a first edge cloud, for supporting a machine learning operation. When detecting that additional computing resources outside the first edge cloud are needed for the machine learning operation, the first agent obtains said additional computing resources from a second edge cloud. The machine learning operation is then performed by using computing resources in the first edge cloud and the additional computing resources obtained from the second edge cloud.

21 Claims, 7 Drawing Sheets

Fig. 2

(56) References Cited

U.S. PATENT DOCUMENTS

| | | | |
|---|---|---|---|
| 2012/0072765 A1* | 3/2012 | Bower, III | G06F 11/2035 |
| | | | 714/E11.071 |
| 2012/0131178 A1* | 5/2012 | Zhu | H04L 67/1004 |
| | | | 709/224 |
| 2014/0067758 A1* | 3/2014 | Boldyrev | G06F 9/5088 |
| | | | 707/610 |
| 2017/0339070 A1 | 11/2017 | Chang et al. | |
| 2018/0145927 A1* | 5/2018 | Srikanteswara | H04L 45/14 |
| 2018/0262431 A1* | 9/2018 | Zhang | H04L 47/20 |
| 2019/0013996 A1* | 1/2019 | Thubert | H04L 67/63 |
| 2019/0041853 A1* | 2/2019 | Jain | B62D 15/0285 |
| 2019/0087231 A1* | 3/2019 | Huh | G06F 9/5088 |
| 2019/0102717 A1* | 4/2019 | Wu | H04L 41/147 |
| 2019/0116128 A1* | 4/2019 | Guo | H04L 67/1021 |
| 2020/0021537 A1* | 1/2020 | Oliveira | H04L 47/72 |
| 2020/0050951 A1* | 2/2020 | Wang | G06N 20/00 |
| 2020/0099742 A1* | 3/2020 | Puente | H04L 67/52 |
| 2021/0326185 A1* | 10/2021 | Opsenica | G06F 9/5077 |
| 2022/0210160 A1* | 6/2022 | Opsenica | H04L 47/82 |

\* cited by examiner

Centralized ML process:

| Process a | Process a | Process a | Process b | Process b | Process b |
|---|---|---|---|---|---|
| Clk 1 | Clk 2 | Clk 3 | Clk 4 | Clk 5 | Clk 6 |

Finished processes:
a & b

Fig. 8A

Decentralized ML process:

| | | | | | | |
|---|---|---|---|---|---|---|
| A1 | Process a1 | Process b | Process b | Process b | Process e1 | Process f1 |
| A2 | Process a2 | Process c | Process c | Process c | Process e2 | Process f2 |
| A3 | Process a3 | Process d | Process d | Process d | Process e3 | Process f3 |
| | Clk 1 | Clk 2 | Clk 3 | Clk 4 | Clk 5 | Clk 6 |

Finished processes:
a (a1 + a2 + a3)
b, c, d
e (e1 + e2 + e3)
f (f1 + f2 + f3)

Fig. 8B

METHOD, FIRST AGENT AND COMPUTER PROGRAM PRODUCT CONTROLLING COMPUTING RESOURCES IN A CLOUD NETWORK FOR ENABLING A MACHINE LEARNING OPERATION

TECHNICAL FIELD

The present disclosure relates generally to a method and a first agent controlling computing resources in a first edge cloud, for supporting or enabling a machine learning operation.

BACKGROUND

In the field of cloud computing, resources for computing, processing and storing of data can be hired and used temporarily, e.g. for execution of machine learning operations. When an operation or task is completed, the used resources are released to become available for other operations. Such cloud resources may be deployed in large data centers, commonly known as "the cloud", which are typically attached to various communications networks. The communications networks mentioned herein may be any type of networks that can be used by clients for accessing the cloud, e.g. including wireless, fixed, public and private networks, using any suitable protocols and standards for communication. Machine learning (ML) operations are usually executed on huge amounts of data provided by various communication devices and nodes, such as network nodes, servers, wireless devices, Machine-to-Machine devices, Internet-of-Things, IoT, devices, and so forth.

Recently, a technology known as "Edge computing" has been developed which can be used to optimize applications or cloud computing systems by executing at least some portion thereof at the "edge" of a cloud environment, herein called "edge cloud", which is generally closer to the clients and end users than the more traditional cloud core or "central cloud", as schematically illustrated in FIG. 1. This figure depicts a cloud environment which is comprised of a central cloud to which a set of edge clouds are attached. In this context, the central cloud is sometimes also referred to as the "back-end cloud" which in practice may be comprised of several individually controlled and administrated sets of computing resources or central clouds. Each edge cloud is further connected to one or more access networks by which various clients can communicate with a respective edge cloud.

In this disclosure, an edge cloud generally refers to a set of computing resources located relatively close to clients so that they can communicate directly with the edge cloud through a suitable access network, as opposed to the central cloud which has computing resources located relatively far away from the clients, as can be seen in the figure.

For example, a client may manage IoT devices which supply data measured or registered by various sensors to an edge cloud. The data can then be processed by the computing resources in the edge cloud to produce various forms of output, depending on the implementation. The data processing may include performing analytics to attain some desired knowledge from the input data by feeding the data to a machine learning operation which includes applying a trained learning model on the data. If the machine learning operation is performed at an edge cloud as described above, it is an advantage that the outcome of this operation can be delivered to a client with reduced latency and the bandwidth for communications required between the client and the edge cloud is also reduced, as compared to centralized cloud computing.

However, there are typically certain constraints in the above-described edge clouds in terms of resource availability, and the amount of available computing resources is thus limited. As a result, it is often a problem that there are simply not enough computing resources available in an edge cloud to support and execute a machine learning operation which may be very complex and require substantial amounts of computing resources. In that case it will be necessary to perform the machine learning operation in the central cloud with the above-described drawbacks of high latency and bandwidth consumption in the communication of data and information between client and computing resources.

SUMMARY

It is an object of embodiments described herein to address at least some of the problems and issues outlined above. It is possible to achieve this object and others by using a method and a first agent as defined in the attached independent claims.

According to one aspect, a method is performed by a first agent controlling computing resources in a first edge cloud, for enabling a machine learning operation. In this method, the first agent detects that additional computing resources outside the first edge cloud are needed for the machine learning operation, and obtains said additional computing resources from a second edge cloud. The machine learning operation is then performed by using computing resources in the first edge cloud and the additional computing resources obtained from the second edge cloud.

According to another aspect, a first agent is arranged to enable a machine learning operation when controlling computing resources in a first edge cloud. The first agent is configured to detect that additional computing resources outside the first edge cloud are needed for the machine learning operation, and to obtain said additional computing resources from a second edge cloud. The first agent is further configured to perform the machine learning operation by using computing resources in the first edge cloud and the additional computing resources obtained from the second edge cloud.

When using either of the above method and first agent, the advantages of reduced latency and less required bandwidth can be achieved even when the first edge cloud has not enough computing resources as required by the machine learning operation. The complete machine learning operation can thus be performed by only using local computing resources in both the first edge cloud and the second edge cloud, instead of having to use centralized computing resources in a central cloud.

The above method and first agent may be configured and implemented according to different optional embodiments to accomplish further features and benefits, to be described below.

A computer program is also provided comprising instructions which, when executed on at least one processor in the above first agent, cause the at least one processor to carry out the method described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which:

FIG. 8A is a table illustrating how a centralized ML computing process may be executed in a single edge cloud controlled by a ML agent, according to a conventional procedure.

FIG. 8B is a table illustrating how a decentralized ML computing process may be executed in three different edge clouds controlled by three respective ML agents A1-A3, according to further example embodiments.

DETAILED DESCRIPTION

Figure 1:
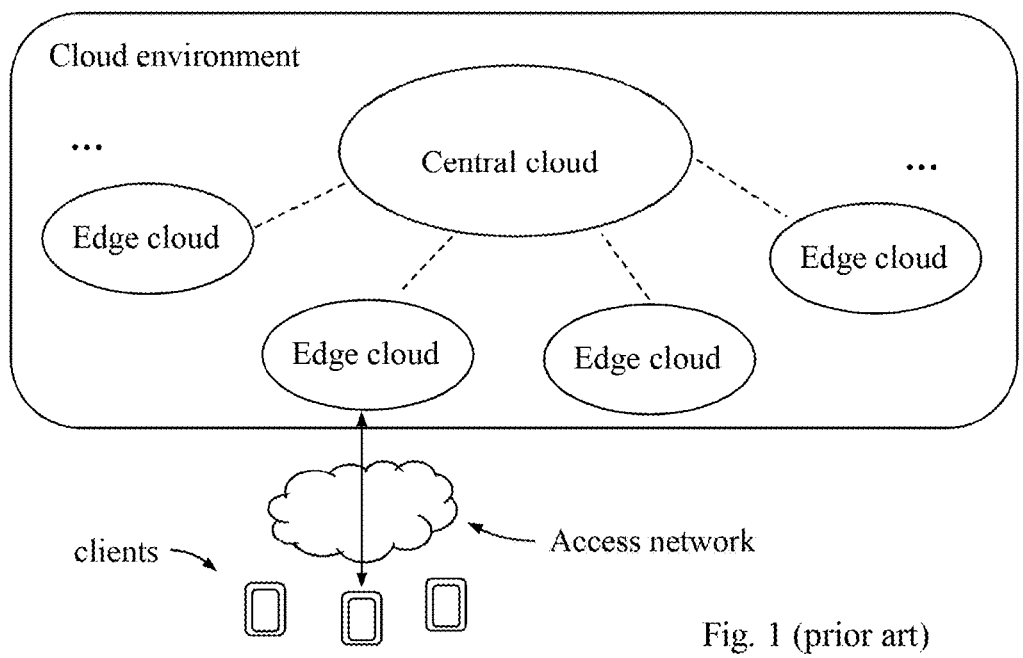
FIG. 1 is a schematic illustration of a typical cloud environment, according to the prior art.

Briefly described, a solution is provided to overcome the above-described resource constraints in edge clouds without having to execute an ML computing operation in a centralized cloud. This can be achieved by using computing resources in a first edge cloud and also additional computing resources in (at least) a second edge cloud, so that the ML computing operation is essentially divided into at least two "sub-operations", one executed in the first edge cloud and another in the second edge cloud, to achieve the total ML computing operation. Thereby, the above-described drawbacks of high latency and bandwidth consumption associated with a centralized ML process can be avoided or at least reduced.

The solution will now be described and explained in terms of functionality in a first agent which is operable to control computing resources in a first edge cloud for enabling an ML operation. The term "agent" used throughout this disclosure can be understood as a logical entity that may be realized in one or more physical nodes connected to the first edge cloud which comprises a set of computing resources with limited capacity. As mentioned above, the computing resources available locally in the first edge cloud may not be sufficient for executing a particular ML operation which may be complex and resource demanding, and this can be resolved by "borrowing" computing resources from another neighboring edge cloud, herein referred to as a second edge cloud. Throughout this disclosure, the term agent could be substituted by the more descriptive "machine learning agent" or "edge cloud agent".

The second edge cloud may thus have additional computing resources available for usage by the first agent so as to achieve the ML computing operation by utilizing computing resources from both the first and the second edge clouds. Throughout this description, it is thus assumed that the ML operation cannot be performed by the first edge cloud alone and that additional computing resources outside the first edge cloud are needed for the ML operation.

It should be noted that the solution is not limited to borrowing computing resources from just one other edge cloud but they can be borrowed from any number of edge clouds in the manner described herein, e.g. depending on the ML demands as well as availability and capacity of the resources in the other edge clouds. Hence, the second edge cloud described herein could in some examples practically be comprised of one or more edge clouds other than the first edge cloud.

Further, the first agent may be configured with a predefined list of "preferred" neighbouring edge clouds from which it is deemed favourable to borrow computing resources in terms of latency and communication bandwidth. Such a list of neighbouring edge clouds could also be referred to as a set of candidate edge clouds. Whenever detecting that additional computing resources are needed for an ML operation, the first agent can send a request for resources from one or more of the edge clouds on the list and then select the edge cloud that can provide the best results, e.g. by matching the ML operation with the capabilities of the candidate edge clouds.

Reference will also be made to a second agent which is operable to control computing resources in the second edge cloud. The second agent may be similar to the first agent and may have basically the same functionalities as described herein for the first agent. For example, it is generally described that the first agent requests for additional computing resources from the second edge cloud and that the second agent provides additional computing resources to the first agent. The opposite may also occur, i.e. that the second agent requests for additional computing resources from the first edge cloud and that the first agent provides additional computing resources to the second agent. Even though it may be unlikely that computing resources are borrowed in both directions at the same time for different ML operations, it should not be excluded. For example, an ML operation in the second edge cloud may need additional resources that have different characteristics than the additional resources needed by a simultaneously ongoing ML operation in the first edge cloud.

An example of how the solution may be employed in a first agent will now be described with reference to FIG. 2 which shows some operations that could be performed by the first agent 200 when controlling computing resources in a first edge cloud 200A. In this example, the first edge cloud 200A is shown to comprise a set of computing resources, here illustrated as white sections indicating currently available resources and black sections indicating currently occupied resources. A similar illustration is also made for a second edge cloud 202A having available and occupied resources controlled by a second agent 202. The computing resources in either edge cloud 200A, 202A may be dedicated for ML operations, e.g. by being specially adapted thereto, or may be general resources suitable for any computing operations. A mix of both dedicated and general computing resources may also be comprised in the edge clouds and the solution is not limited in this respect.

A first action 2:1 illustrates that an ML operation is initiated in the first edge cloud, e.g. in response to receiving a cloud computing request from a client, not shown. The first agent 200 allocates computing resources for the ML operation in the first edge cloud 200A, in an action 2:2. The first agent 200 further detects that there is not enough resources available in the first edge cloud 200A and that more resources are consequently needed for proper execution of the ML operation, in an action 2:3. In this action, the first agent 200 also identifies what computing resources are missing to achieve the ML operation, e.g. to execute a series of computing tasks, which could also be referred to as ML tasks, where each task requires a certain amount and type of resources.

A further action 2:4 illustrates that the first agent 200 sends a request for additional computing resources to the second agent 202 controlling computing resources in the second edge cloud 202A. This request may indicate one or more of the following requirements:

A) The amount of additional computing resources that are needed for the ML operation, apart from the resources in the first edge cloud 200A that were allocated in action 2:2.

B) What type of additional computing resources are needed. For example, there may be at least two different types of computing resources in an edge cloud including resources that are specifically adapted and/or reserved for ML operations and resources that are useful for any computing tasks. The latter type of resources could be requested in case there are not enough of the first type of resources available.

C) An estimated usage time during which the additional computing resources need to be borrowed by the first agent 200 for the ML operation.

D) A description of one or more computing tasks that the additional computing resources need to execute.

E) A desired machine learning technique that will be employed when performing the ML operation using the additional computing resources in the second edge cloud 202A.

When receiving the request from the first agent 200, the second agent 202 determines which computing resources are currently available in second edge cloud 202A and can be borrowed to assist the first agent 200 and the first edge cloud 200A. It is schematically shown in the figure that the second edge cloud 202A has more available resources than the first edge cloud 200A, although this may not necessarily be the case. As mentioned above, resources of a specific type or capacity may be missing in the first edge cloud 200A even though it has plenty of free resources of other types/capacities that cannot be used for the present ML operation.

The second agent 202 accordingly allocates additional computing resources in the second edge cloud 202A to assist the ML operation in the first edge cloud 200A, in an action 2:5. The second agent 202 further sends a response to the first agent 200, in an action 2:6, to basically indicate allocation, or availability, of the additional computing resources in the second edge cloud 202A. This response may comprise a description of the additional computing resources allocated in action 2:5, including information about one or more of:

a) The amount of additional computing resources allocated in the second edge cloud 202A for the ML operation.

b) The type of allocated additional computing resources.

c) A usage time during which the additional computing resources will be available for use by the first agent 200.

d) A description of computing tasks that the allocated additional computing resources are capable of executing.

e) The machine learning technique(s) that the allocated additional computing resources support.

The first agent 200 is then able to determine and organize a sequence of computing tasks that should be executed in the second edge cloud 202A using the additional computing resources allocated therein, as a complement to other computing tasks that can be executed in the first edge cloud 200A. In a following action 2:7, the first agent 200 accordingly sends one or more specific computing tasks to the second agent 202. A further action 2:8 schematically illustrates that the ML operation is performed using computing resources in both the first edge cloud 200A and the second edge cloud 202A. In this action, the ML operation can be seen as comprising a first ML sub-operation executed by the computing resources in the first edge cloud 200A which were allocated in action 2:2, and a second ML sub-operation executed by the additional computing resources in the second edge cloud 202A which were allocated in action 2:5.

Finally, the first agent 200 also aggregates the first and second ML sub-operations, in an action 2:8A, which may be performed in parallel to the actual ML operation. Each ML sub-operation may be comprised of a number of individual computing tasks which were contemplated in the above action 2:3. This way, the complete ML operation is achieved by using local computing resources in both the first edge cloud 200A and the second edge cloud 202A, instead of having to use centralized computing resources in the central cloud. It is an advantage that the performance of the ML operation can thereby be improved thanks to reduced latency and relaxed bandwidth requirements.

An example of how the solution may be employed in terms of actions which may be performed by a first agent such as the first agent 200, is illustrated by the flow chart in FIG. 3 which will now be described with further reference to FIG. 2, although this procedure is not limited to the example of FIG. 2. The actions in FIG. 3 could thus be performed by the first agent 200, which is operable to control computing resources in the first edge cloud 200A, for enabling a machine learning operation without having to use computing resources in a central cloud.

A first action 300 illustrates that the first agent 200 may receive a request for the machine learning operation from a client or the like, which corresponds to the above action 2:1. In another action 302, the first agent 200 detects that additional computing resources outside the first edge cloud 200A are needed for the machine learning operation, e.g. after allocating resources that are available in the first edge cloud 200A as in the above action 2:2. This action corresponds to the above action 2:3.

In a further action 304, the first agent 200 obtains the additional computing resources from a second edge cloud 202A, e.g. after sending a request to a second agent 202 associated with the second edge cloud 202A as in the above action 2:4. A final action 306 illustrates that the first agent 200 performs the machine learning operation by using computing resources in the first edge cloud 200A and the additional computing resources obtained from the second edge cloud 202A. Thereby, the above-described advantages of reduced latency and less required bandwidth can be achieved in spite of local constraints in the first edge cloud 200A, as compared to using a centralized machine learning operation.

Some further examples of embodiments that may be employed in the above procedure in FIG. 3 will now be described. In one example embodiment, said detecting in action 302 may comprise finding that performance of a learning model used in the machine learning operation is degraded. This could be referred to as a "bad model" to indicate the degraded performance. When training an ML model in general, the model is continuously evaluated by applying available input values to the model to see how well a prediction generated by the model agrees with subsequent measurements and observations, which thus determines whether the model is bad or good. Numerous techniques for machine learning as such have been described in the art, which is however outside the scope of this disclosure.

In another example embodiment, said obtaining may comprise sending a request for the additional computing resources to a second agent 202 controlling computing resources in the second edge cloud 202A. This embodiment corresponds to the above action 2:4. In that case, further example embodiments may include that the request indicates at least one of: required amount of additional computing resources, required type of additional computing resources, estimated usage time, task description and desired machine learning technique. These alternatives have been described in more detail above as the requirements A-E that could be indicated in such a request which may thus include any number of the above requirements.

In actions 2:4, it was only described that the request is sent to the second agent 202. In another example embodiment, the request may be sent to multiple agents controlling computing resources in respective edge clouds. In that case, another example embodiment may be that said agents are identified from a predefined list of neighbouring edge clouds which could also be referred to as candidate edge clouds which are deemed favourable, e.g. with respect to latency and bandwidth consumption, to utilize for borrowing additional computing resources whenever needed.

When sending the request to multiple agents, a further example embodiment may be that a response with cloud capabilities of the respective candidate edge clouds is received from the agents, and the first agent 200 may then select the second edge cloud from the candidate edge clouds based on the cloud capabilities of the second edge cloud. In this context, the term cloud capabilities refers to ML capabilities of resources in the respective candidate edge clouds. For example, the candidate edge cloud having resources that best matches the requirements and needs of the present machine learning operation, e.g. as identified in action 2:3, can be selected as the second edge cloud 202A. It may also be possible to select more than one of the candidate edge clouds to utilize additional computing resources therein for the ML operation, if needed. In another example embodiment, the request could be sent to one or more agents as a Hypertext Transfer Protocol, HTTP, request using peer-to-peer communication.

In another example embodiment, the machine learning operation may be performed by aggregating a first machine learning sub-operation executed by the computing resources in the first edge cloud 200A and a second machine learning sub-operation executed by the additional computing resources in the second edge cloud 202A. This embodiment corresponds to the above action 2:8A.

In another example embodiment, the second machine learning sub-operation may be initiated by sending a corresponding machine learning task to the second agent. In this embodiment, it should be understood that more than one such machine learning task could also be sent to the second agent 202 to achieve the second machine learning sub-operation. In this context, a machine learning task could also be referred to as a computing task and these two terms are used herein interchangeably.

It was mentioned above that that the first agent 200 may also provide additional computing resources from the first edge cloud 200A to the second agent to assist an ML operation in the second edge cloud 202A, thus reversing the above-described roles of the first and second agents 200, 202. In another example embodiment, when there are free computing resources in the first edge cloud 200A, the first agent 200 may provide additional computing resources for a machine learning operation in another edge cloud which may generally be referred to as a "third" edge cloud which could be the second edge cloud 202A as said above or any other edge cloud. This embodiment will be mentioned as an option when describing the next figure. In that case, another example embodiment may be that the first agent provides said additional computing resources in response to receiving a request for additional computing resources from an agent controlling computing resources in the third edge cloud, such as agent 202.

Figure 3:
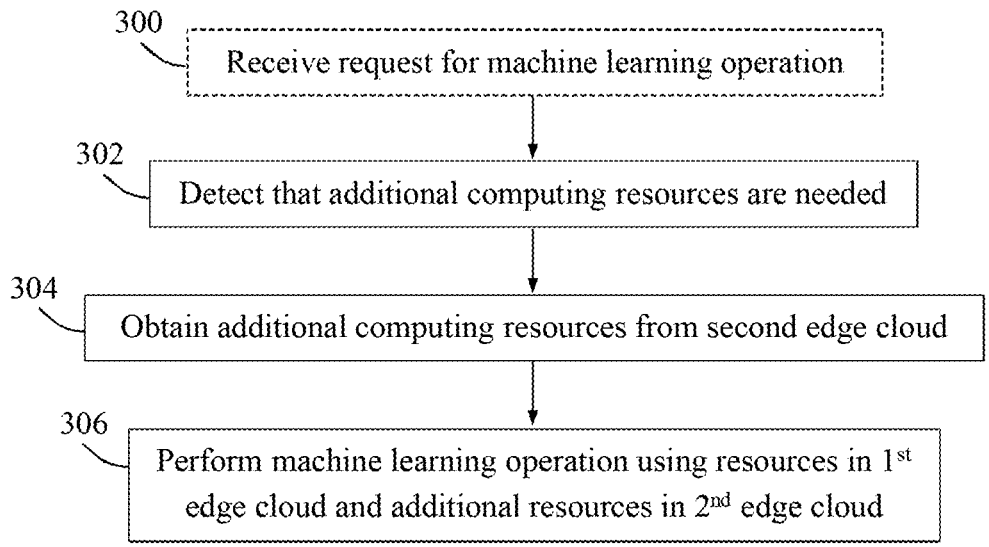
FIG. 3 is a flow chart illustrating a procedure in a first agent, according to further example embodiments.
Figure 4:
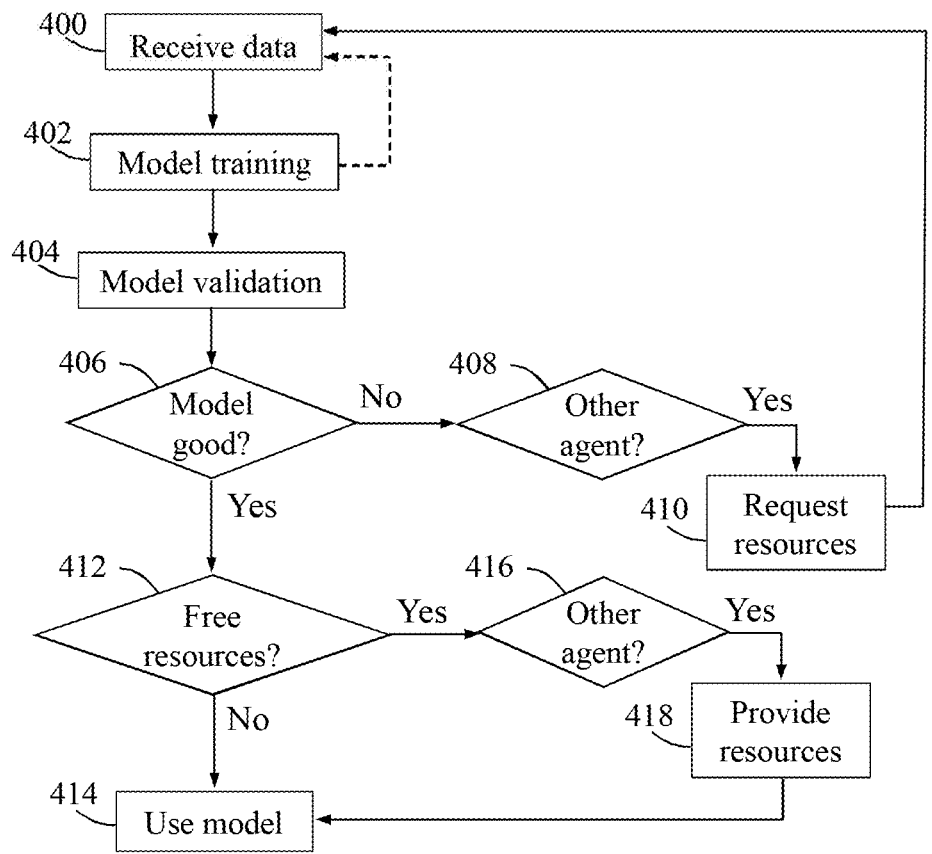
FIG. 4 is a flow chart illustrating an example of how a first agent may operate in more detail, according to further example embodiments.

An example of how the procedure in FIG. 3 may be applied in practice will now be described with reference to the flow chart in FIG. 4 illustrating actions that could be performed by the above-described first agent 200 according to different options. A first action 400 illustrates that the first agent 200 receives data which is used as input for training a learning model in an action 402. Actions 400 and 402 may be performed in parallel for a while on a continuous basis, as indicated by a dashed arrow, to feed more fresh data to the model in the training, typically involving more or less complex computing activities.

The model is sometimes validated in a further action 404, to see if the model is good or bad, which was also explained above. The model is thus evaluated in another action 406 with respect to good or bad. If the model is considered to be bad (not good), it can be deduced that the model needs to be improved by utilizing additional computing resources outside the first edge cloud 200A. It is therefore checked, in a next action 408, whether there is any other agent that can provide the needed additional computing resources, e.g. by checking a list of neighbouring edge clouds and their associated agents. Once a candidate edge cloud is found in action 408, the first agent 200 sends a request for additional computing resources to the agent of that candidate edge cloud, in a further action 410, which procedure has been described above and is not necessary to repeat here. After action 410 or when action 408 is negative, not shown, the process may return to action 400 for receiving more data and training the model further, with or without any additional computing resources.

If it is determined that the model is already good in action 406, the first agent 200 further checks, in an action 412, if there are any free and available computing resources in the first edge cloud 200A that could be borrowed for another ML operation. If not, the first agent 200 will just use the good model for its own ML operation, in an action 414. In case there are some free and available computing resources in the first edge cloud 200A, the first agent 200 further checks whether there is any other agent that may be in need of additional computing resources, in an action 416. If so, the first agent 200 can provide them to the other agent in an action 418 while also using its own model in action 414. If not, the first agent 200 will just use its own model in action 414.

Figure 5:
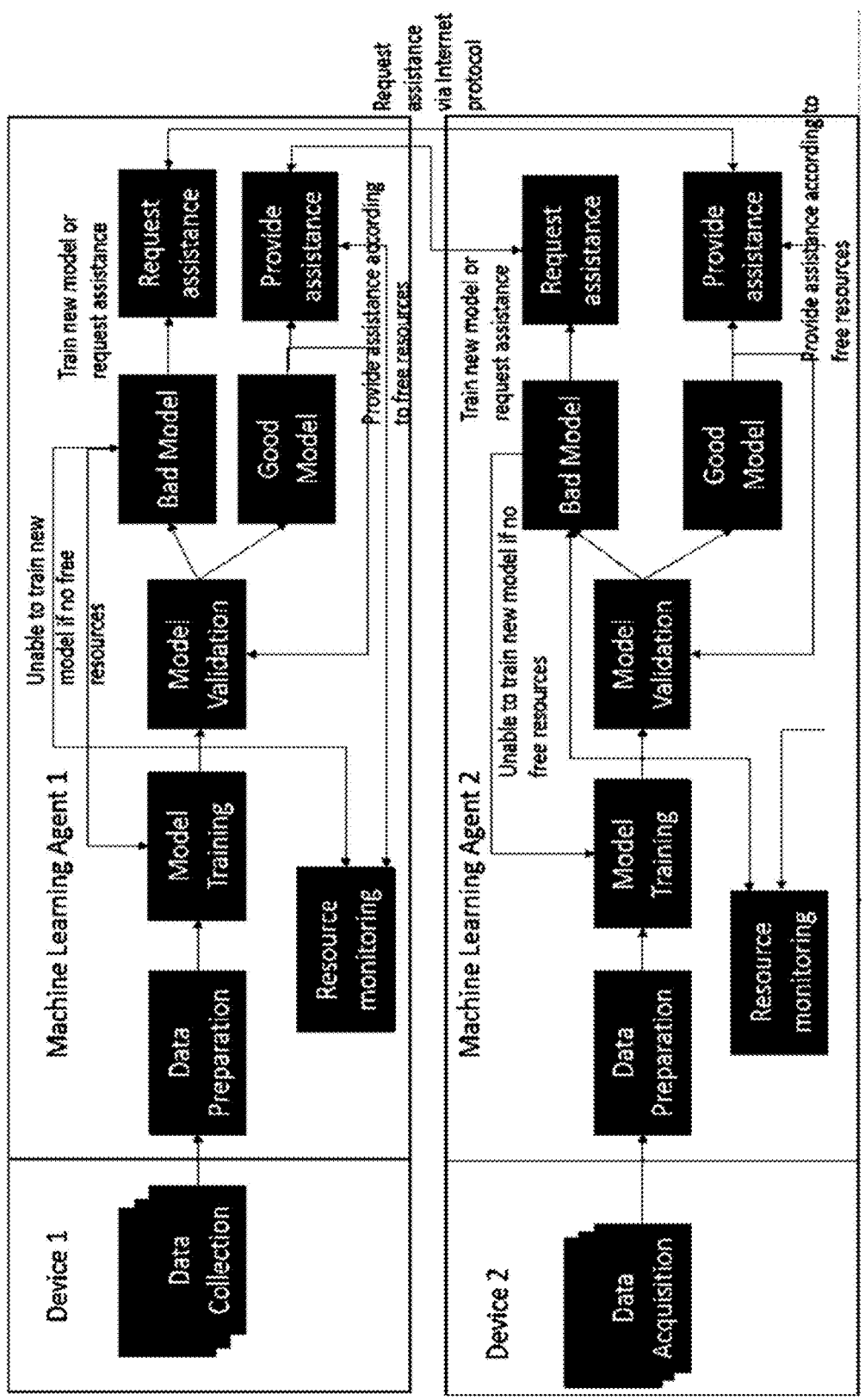
FIG. 5 is a block diagram illustrating a practical example of how two agents may operate and interact when applying machine learning in two respective edge clouds, according to further example embodiments.

The block diagram in FIG. 5 illustrates a more detailed practical example of how two agents, denoted Machine Learning Agent 1 and Machine Learning Agent 2, may operate and interact when performing ML operations in two respective edge clouds which may correspond to the first and second edge clouds 200A, 202A described above. It can be seen that data is collected or acquired from schematically illustrated Devices 1 and 2, respectively, which data is fed into a model training process by either agent 1 and 2.

After model validation, if the model is considered "bad", assistance in terms of additional computing resources is requested from another agent. On the other hand, if the model is considered "good", assistance in terms of additional computing resources can instead be provided to another agent according to free and available resources, if needed. A resource monitoring block is also shown in each agent 1, 2 to illustrate that the current status of computing resources in the respective edge cloud is monitored with respect to availability. If this block indicates no free resources in the own edge cloud, additional computing resources could be requested from the opposite agent.

Figure 6:
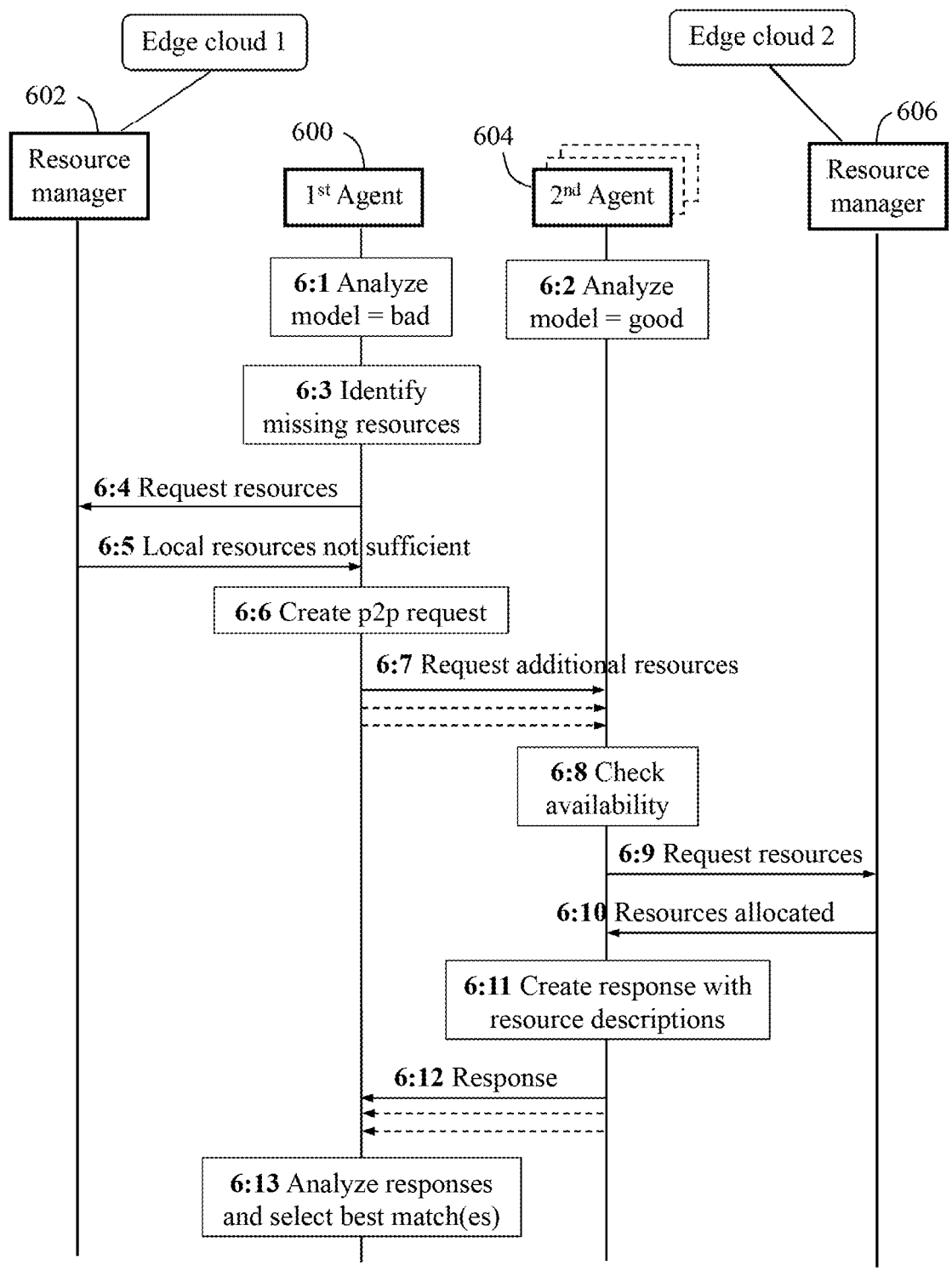
FIG. 6 is a signaling diagram illustrating an example of how a first agent may operate and interact with a second agent to establish additional computing resources, according to further example embodiments.

A further example of how the above described solution and embodiments may be employed for acquiring computing resources for an ML operation, will now be briefly described with reference to the signalling diagram in FIG. 6, involving a first agent 600 and a resource manager 602 of a first edge cloud and a second agent 604 and a resource manager 606 of a second edge cloud.

Action 6:1

The first agent 600 analyses a currently used model and finds that the model is "bad", e.g. by identifying an incorrect optimization value being monitored as output from the model.

Action 6:2

The second agent 604 analyses a currently used model and finds that the model is "good", e.g. by identifying an accurate optimization value being monitored as output from the model.

Action 6:3

The first agent 600 identifies missing computing resources that are needed to improve the currently used model.

Action 6:4

The first agent 600 requests for local computing resources in the first edge cloud from the resource manager 602.

Action 6:5

The resource manager 602 notifies the first agent 600 that there are not sufficient computing resources available in the first edge cloud.

Action 6:6

The first agent 600 creates a peer-to-peer request for additional computing resources from outside the first edge cloud.

Action 6:7

The first agent 600 sends the peer-to-peer request to the second agent 604 and also to one or more further selected agents of other edge clouds, as indicated by dashed arrows.

Action 6:8

The second agent 604 (and other agents) checks availability of free computing resources in the second edge cloud.

Action 6:9

The second agent 604 requests for computing resources in the second edge cloud from the resource manager 606. Such computing resources may already be reserved for ML operations in the second edge cloud.

Action 6:10

The resource manager 606 notifies the second agent 604 that the requested computing resources have been allocated in the second edge cloud.

Action 6:11

The second agent 604 creates a response with descriptions of the computing resources allocated in the second edge cloud. These descriptions may contain the information described above as options a-e which could be included in the response sent in the above action 2:6.

Action 6:12

The second agent 604 sends the created response to the first agent 600. Similar responses are also received from other agents, as indicated by dashed arrows.

Action 6:13

The first agent 600 analyzes the received responses and selects the agent/edge cloud that can provide the best match to requirements of the needed computing resources identified in action 6:3.

Figure 7:
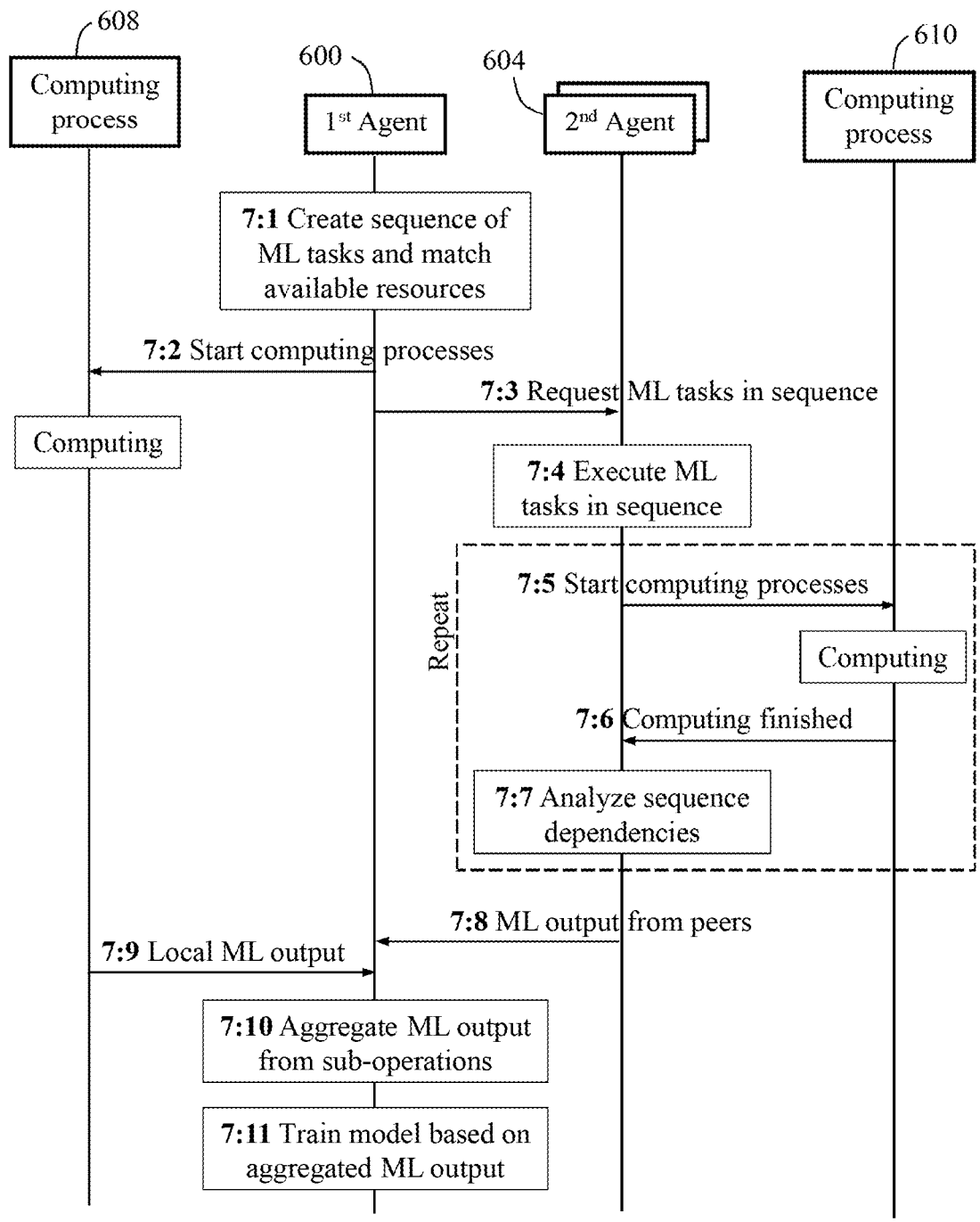
FIG. 7 is another signaling diagram illustrating how the first agent in FIG. 6 may operate and interact to use the additional computing resources in an ML computing process, according to further example embodiments.

A further example of how the above described solution and embodiments may be employed when utilizing computing resources borrowed from another edge cloud, will now be briefly described with reference to the signalling diagram in FIG. 7, involving the first agent 600 and a computing process 608 being performed on computing resources in the first edge cloud, and the second agent 604 and another computing process 610 being performed on computing resources in the second edge cloud. The second agent 604 is one of a set of peers selected in action 6:13, that assist the first agent 600 with additional computing resources.

Action 7:1

The first agent 600 creates a sequence of ML tasks, which could also be referred to as computing tasks, and matches available resources in the first and second cloud edges with each ML task in the sequence. This matching may be performed by analyzing requirements of each task and identifying available resources that are capable of meeting those requirements. Some of the ML tasks are further assigned to a first ML sub-operation executed by computing resources in the first edge cloud, while other ML tasks in the sequence are assigned to a second ML sub-operation executed by additional computing resources in the second edge cloud.

Action 7:2

The first agent 600 starts the computing processes in the computing process block 608.

Action 7:3

The first agent 600 sends requests to the other agents, i.e. peers, for executing the ML tasks in the created sequence.

Action 7:4

The second agent 604 (and the other agents) starts to execute the requested ML tasks in the sequence. For each ML task, the following is performed by the second agent 604 (and similar by the other agents).

Action 7:5

The second agent 604 starts the relevant computing processes in the computing process block 610.

Action 7:6

When finished, the second agent 604 receives from the computing process block 610 output information as a result of the computing processes.

Action 7:7

The second agent 604 analyzes so-called "sequence dependencies". In general, ML computing may involve one task or a sequence of tasks, and in the latter case the second agent 604 might contribute with resources for several tasks in sequence such that the final sequence result can be pushed back to the first agent 600. For instance, a sequence of tasks may be related to iterations of a learning procedure.

Action 7:8

The second agent 604 (and the other agents) delivers the outcome from the computing processes executed in the second edge cloud (and other edge clouds), denoted ML output, to the first agent 600. This outcome results from the second ML sub-operation.

Action 7:9

The first agent 600 also receives from the computing process block 608 the outcome from the computing processes executed locally in the first edge cloud, denoted local ML output, resulting from the first ML sub-operation.

Action 7:10

The first agent 600 aggregates the received ML output of the first and second ML sub-operations.

Action7:11

The first agent 600 trains the model based on the ML output aggregated in action 7:10.

An example of how a centralized ML computing process may be executed in a single edge cloud controlled by an agent of the edge cloud according to a conventional procedure, is illustrated in the table of FIG. 8A. In this example, two processes a and b are executed in the edge cloud which has sufficient computing resources to achieve both a and b. In this table, "Clk 1-6" refers to a succession of clock cycles 1-6. As a result, processes a and b can be finished in the edge cloud after Clk 1-3 and Clk 4-6, respectively.

As explained above, the embodiments described herein can be helpful when the local computing resources in one edge cloud are not sufficient for executing all required processes in the edge cloud alone, thus needing assistance from additional resources in one or more other edge clouds. An example of how the embodiments herein may be used for executing a decentralized ML computing process in three different edge clouds controlled by three respective agents A1-A3, is illustrated in the table of FIG. 8B. The agent A1 may correspond to the above-described first agent 200, 600 and the agents A2 and A3 may correspond to the above-described second agent 202, 604.

In this example, processes a-f are to be executed in respective ML operations performed by the agent A1. Process a is divided into three sub-operations or sub-processes a1, a2 and a3, process e is divided into three sub-operations e1, e2 and e3, and process f is likewise divided into three sub-operations or sub-processes f1, f2 and f3. The sub-processes a1, b, e1 and f1 are executed by means of resources in the edge cloud controlled by agent A1, the sub-processes a2, c, e2 and f2 are executed by means of resources in the edge cloud controlled by agent A2, and the sub-processes a3, d, e3 and f3 are executed by means of resources in the edge cloud of agent A3.

As a result, processes b, c and d can be finished in the edge clouds controlled by agents A1, A2 and A3, respectively, alone without assistance from any other edge clouds. On the other hand, processes a, e and f need computing resources from all three edge clouds. In more detail, process a is executed by aggregating the sub-processes a1, a2 and a3, process e is executed by aggregating the sub-processes e1, e2 and e3, and process f is executed by aggregating the sub-processes f1, f2 and f3. It can be seen in the above examples that the decentralized process of FIG. 8B can complete a greater number of processes a-f in the same amount of time, i.e. by Clk 6, in which the centralized process of FIG. 8A is able to complete only two processes a-b. As a result, performance can be improved by sharing computing resources among multiple edge clouds, in order to, e.g., satisfy a latency constraint.

Figure 9:
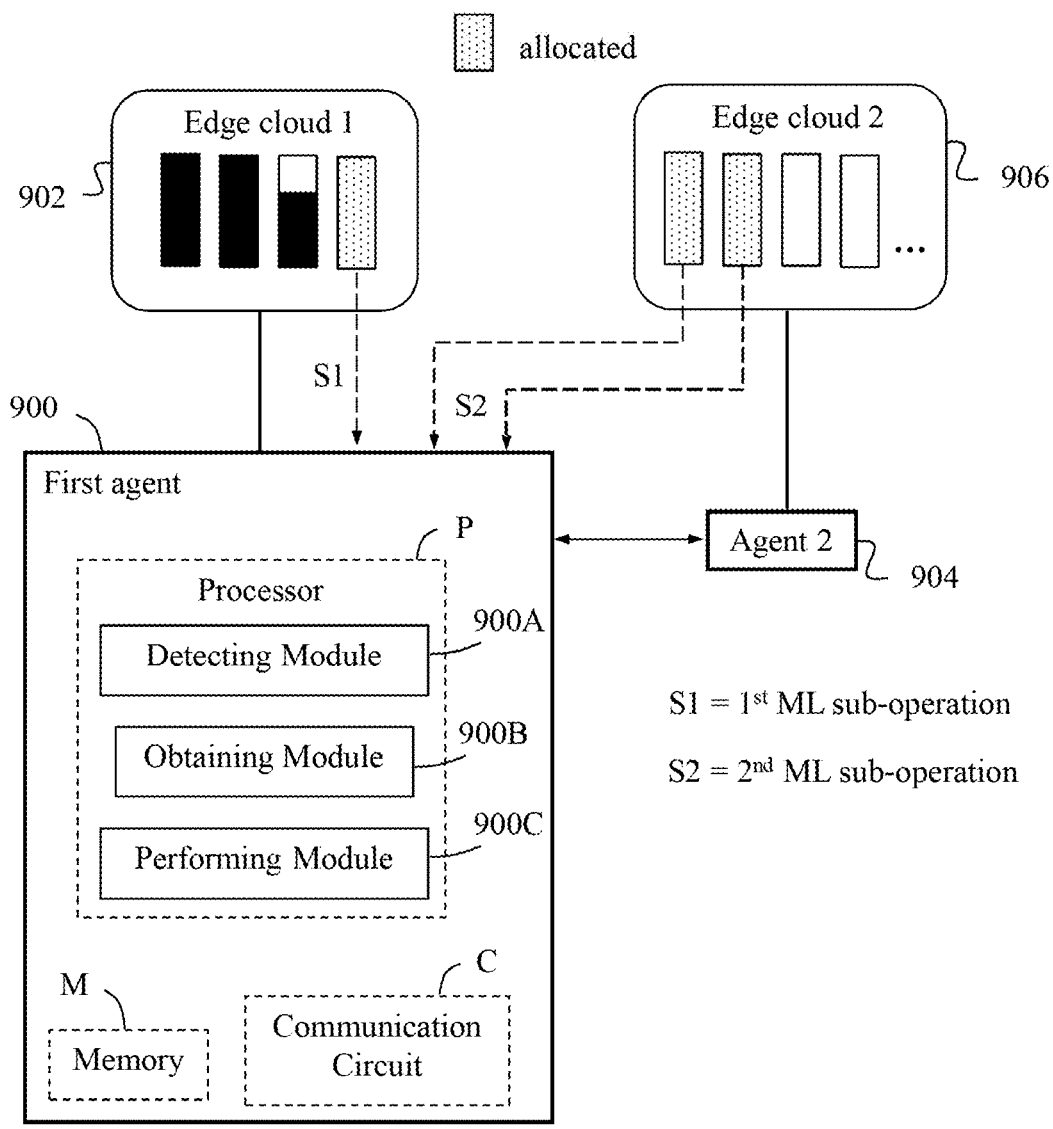
FIG. 9 is a block diagram illustrating how a first agent may be structured, according to further example embodiments.

The block diagram in FIG. 9 illustrates a detailed but non-limiting example of how a first agent 900 may be structured to bring about the above-described solution and embodiments thereof. The first agent 900 may be configured to operate according to any of the examples and embodiments for employing the solution as described herein, where appropriate and as follows. The first agent 900 is shown to comprise a processor P and a memory M, said memory comprising instructions executable by the processor P whereby the first agent 900 is operable as described herein. The first agent 900 also comprises a communication circuit C with suitable equipment for receiving and sending information and messages in the manner described herein.

Figure 2:
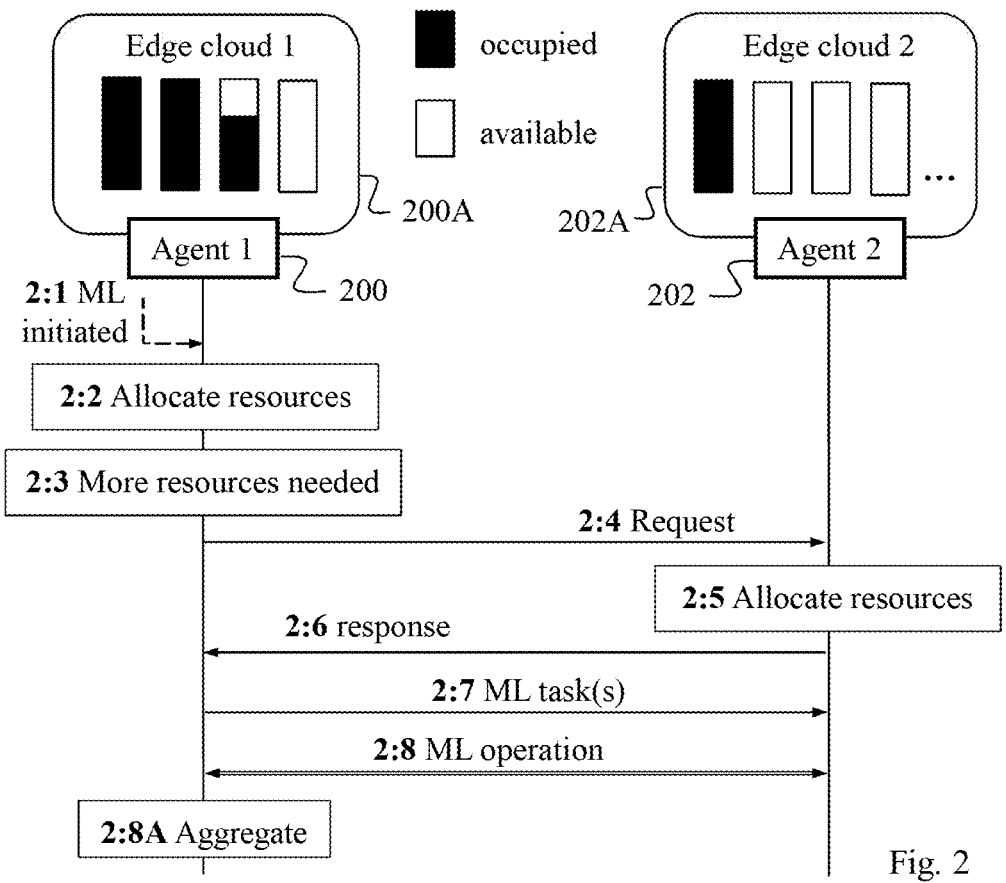
FIG. 2 is a communication scenario illustrating an example of how the solution may be employed by using a first agent associated with a first edge cloud, according to some example embodiments.

The first agent 900 corresponds to the first agent 200 in FIG. 2. The communication circuit C may be configured for requesting and receiving computing resources from one or more agents, using suitable protocols and messages. The solution and embodiments herein are not limited to using any specific types of messages or protocols for the above communication although the protocol HTTP and peer-to-peer communication are mentioned herein as a practical example.

The first agent 900 comprises means configured or arranged to basically perform at least some of the actions in FIGS. 3 and 4, and more or less as described above for the first agent 200 or 600 in various examples and embodiments. In FIG. 9, the first agent 900 is arranged or configured to enable a machine learning operation when controlling computing resources in a first edge cloud 902, as follows.

The first agent 900 is configured to detect that additional computing resources outside the first edge cloud 902 are needed for the machine learning operation. This operation may be performed by a detecting module 900A in the first agent 900, e.g. in the manner described above for actions 2:3 and 302. The detecting module 900A could alternatively be named a discovering module or analyzing module.

The first agent 900 is further configured to obtain said additional computing resources from a second edge cloud 906, which resources are in this figure controlled by a second agent 904. This obtaining operation may be performed by an obtaining module 900B in the first agent 900, e.g. as described above for actions 2:4-2:6 and 304. The obtaining module 900B could alternatively be named a resource organizing module.

The first agent 900 is also configured to perform the machine learning operation by using computing resources in the first edge cloud 902 and the additional computing resources obtained from the second edge cloud 906. This operation may be performed by a performing module 900C in the first agent 900, e.g. as described above for actions 2:7-2:8A and 306. The performing module 900B could alternatively be named an executing module or a machine learning module.

It should be noted that FIG. 9 illustrates various functional modules or units in the first agent 900, and the skilled person is able to implement these functional modules in practice using suitable software and hardware. Thus, the solution is generally not limited to the shown structures of the first agent 900, and the functional modules or units 900A-C therein may be configured to operate according to any of the features and embodiments described in this disclosure, where appropriate.

The functional modules or units 900A-C described above could thus be implemented in the first agent 900 by means of hardware and program modules of a computer program comprising code means which, when run by the processor P, causes the first agent 900 to perform at least some of the above-described actions and procedures.

In FIG. 9, the processor P may comprise a single Central Processing Unit (CPU), or could comprise two or more processing units such as CPUs. For example, the processor P may include a general purpose microprocessor, an instruction set processor and/or related chip sets and/or a special purpose microprocessor such as an Application Specific Integrated Circuit (ASIC). The processor P may also comprise a storage for caching purposes.

Each computer program may be carried by a computer program product in the first agent 900 in the form of a memory M having a computer readable medium and being connected to the processor P. The computer program product or memory in the first agent 900 may thus comprise a computer readable medium on which the computer program is stored e.g. in the form of computer program modules or the like. For example, the memory M may be a flash memory, a Random-Access Memory (RAM), a Read-Only Memory (ROM), an Electrically Erasable Programmable ROM (EEPROM) or Hard Drive storage (HDD), and the program modules could in alternative embodiments be distributed on different computer program products in the form of memories within the first agent 900.

The solution described herein may thus be implemented in the first agent 900 by a computer program comprising instructions which, when executed on at least one processor, cause the at least one processor to carry out the actions according to any of the above embodiments and examples, where appropriate. The solution may also be implemented in a carrier containing the above computer program, wherein the carrier could be one of an electronic signal, an optical signal, a radio signal, or a computer readable storage product or computer program product.

Two practical examples of how the embodiments and features herein may be employed in reality, will now be described.

Practical Example 1

This example concerns cars that are driving far away from a feasible range of the closest located central cloud, which implies high latency and large bandwidth when executing ML operations. However, multiple cars could be close enough to be in feasible range of their respective edge clouds. If one of the cars has received or trained a bad model for optimization of fuel/battery consumption, it would be harmful to use that model to control the consumption. An agent of one car recognizing a bad model usage could request agents of other cars for resource sharing and model synchronization in distributed model training. Agents that have free available resources in their respective edge clouds could inform the requesting agent about how much resources they have and how long time approximately the resources can be shared. The differences of the similar model usage could be due to the different phases of the system's lifecycle or the present condition of the system.

Practical Example 2

This example concerns autonomous ships which takes advantage in edge computing when sailing and adjusts their engine usage independently. An optimization objective may be to minimize the power usage and maximize the travelled distance. In this example, it is assumed that a ship uses regression based learning which is one of the available supervised learning techniques. The ship may face a scenario when the result of centralized or synchronized learning is not providing satisfying result and the need for more optimized regression model is urgent. The ship's agent could try to conduct machine learning in the edge cloud but if the resources are constrained it would critically reduce the performance of essential and autonomous operations.

One solution of this would be to establish peer-to-peer machine learning with nearby autonomous ships that are able to contribute in the learning process. The ship that establishes the peer-to-peer learning would request for resource information where it could find out whether any nearby ships is capable of regression learning, how much they have available resources and how long the resources would be available for peer-to-peer learning. If there are feasible ships to establish the decentralized learning, the agent of the requesting ship would divide the regression learning process into parts, i.e. sub-operations, which can be conducted in each of participating ships.

In this case, the regression learning process may be divided in such a way that the machine learning agents of ships with higher amount of available resources would handle the higher degree regressions, e.g. Regression learning, "a" is divided into smaller parts "a1", "a2" & "a3" to be processed in three different edge clouds, as similar to the example of FIG. 8B. The sub-process "a1" could include learning a small amount of regressions with smaller degrees, sub-process "a2" could include learning an intermediate amount of regressions with intermediate degrees, and sub-process "a3" could include learning a high amount of regressions with higher degrees. After the regression learning processes are finished, the agent that requested peer-to-peer learning, aggregates the learning results and utilizes the learning results in further deductions.

While the solution has been described with reference to specific exemplifying embodiments, the description is generally only intended to illustrate the inventive concept and should not be taken as limiting the scope of the solution. For example, the terms "edge cloud", "agent", "computing resources", "machine learning operation", "cloud capabilities", "machine learning sub-operation", "computing task" and "machine learning task" have been used throughout this disclosure, although any other corresponding entities, functions, and/or parameters could also be used having the features and characteristics described here. The solution is defined by the appended claims.

The invention claimed is:

1. A method, performed by a first agent controlling computing resources in a first edge cloud, for enabling a machine learning operation, wherein the first agent corresponds to the first edge cloud, the method comprising:
   detecting that additional computing resources outside the first edge cloud are needed for the machine learning operation,
   obtaining said additional computing resources from a second edge cloud, and
   performing the machine learning operation by using computing resources in the first edge cloud and the additional computing resources obtained from the second edge cloud,
   wherein the machine learning operation is performed by aggregating a first machine learning sub-operation executed by the computing resources in the first edge cloud and a second machine learning sub-operation executed by the additional computing resources in the second edge cloud,
   wherein the machine learning operation is performed without using centralized computing resources in a central cloud;
   wherein detecting comprises finding that performance of a learning model used in the machine learning operation is degraded by continuously applying available input values to the learning model and evaluating whether a prediction generated by the model agrees with subsequent measurements.

2. The method according to claim 1, wherein said obtaining comprises sending a request for the additional computing resources to a second agent controlling computing resources in the second edge cloud, and wherein the second agent corresponds to the second edge cloud.

3. The method according to claim 2, wherein the request indicates at least one of: required amount of additional computing resources, required type of additional computing resources, estimated usage time, task description and desired machine learning technique.

4. The method according to claim 2, wherein the request is sent to multiple agents controlling computing resources in respective edge clouds.

5. The method according to claim 4, wherein said agents are identified from a predefined list of neighbouring edge clouds.

6. The method according to claim 4, wherein a response with cloud capabilities of the respective edge clouds is received from the agents, and the second edge cloud is selected based on the cloud capabilities of the second edge cloud.

7. The method according to claim 2, wherein the request is sent as a Hypertext Transfer Protocol, HTTP, request using peer-to-peer communication.

8. The method according to claim 1, wherein the second machine learning sub-operation is initiated by sending a corresponding machine learning task to the second agent.

9. The method according to claim 1, wherein when there are free computing resources in the first edge cloud, the first agent provides additional computing resources for a machine learning operation in a third edge cloud.

10. The method according to claim 9, wherein the first agent provides said additional computing resources in response to receiving a request for additional computing resources from an agent controlling computing resources in the third edge cloud.

11. A computer program stored on a non-transitory computer readable medium, comprising instructions which, when executed on at least one processor, cause the at least one processor to carry out the method according to claim 1.

12. A first agent comprising at least one processor and arranged to enable a machine learning operation when controlling computing resources in a first edge cloud, wherein the first agent corresponds to the first edge cloud and is configured to:
   detect that additional computing resources outside the first edge cloud are needed for the machine learning operation,
   obtain said additional computing resources from a second edge cloud, and
   perform the machine learning operation by using computing resources in the first edge cloud and the additional computing resources obtained from the second edge cloud,
   wherein the first agent is configured to perform the machine learning operation by aggregating a first machine learning sub-operation executed by the computing resources in the first edge cloud and a second machine learning sub-operation executed by the additional computing resources in the second edge cloud,
   wherein the first agent is configured to perform the machine learning operation without using centralized computing resources in a central cloud;
   wherein detecting comprises finding that performance of a learning model used in the machine learning operation is degraded by continuously applying available input values to the learning model and evaluating whether a prediction generated by the model agrees with subsequent measurements.

13. The first agent according to claim 12, wherein the first agent is configured to perform said obtaining by sending a request for the additional computing resources to a second agent controlling computing resources in the second edge cloud, and wherein the second agent corresponds to the second edge cloud.

14. The first agent according to claim 13, wherein the request indicates at least one of: required amount of additional computing resources, required type of additional computing resources, estimated usage time, task description and desired machine learning technique.

15. The first agent according to claim 13, wherein the first agent is configured to send the request to multiple agents controlling computing resources in respective edge clouds.

16. The first agent according to claim 15, wherein the first agent is configured to identify said agents from a predefined list of neighbouring edge clouds.

17. The first agent according to claim 15, wherein the first agent is configured to receive a response with cloud capabilities of the respective edge clouds from the agents, and to select the second edge cloud based on the cloud capabilities of the second edge cloud.

18. The first agent according to claim 13, wherein the first agent is configured to send the request as a Hypertext Transfer Protocol, HTTP, request using peer-to-peer communication.

19. The first agent according to claim 12, wherein the first agent is configured to initiate the second machine learning sub-operation by sending a corresponding machine learning task to the second agent.

20. The first agent according to claim 12, wherein when there are free computing resources in the first edge cloud, the first agent is configured to provide additional computing resources for a machine learning operation in a third edge cloud.

21. The first agent according to claim 20, wherein the first agent is configured to provide said additional computing resources in response to receiving a request for additional computing resources from an agent controlling computing resources in the third edge cloud.

\* \* \* \* \*